(12) United States Patent
Smook

(10) Patent No.: US 8,747,278 B2
(45) Date of Patent: Jun. 10, 2014

(54) PLANET CARRIER OF THE CAGE TYPE

(75) Inventor: Warren Gregory Smook, Huldenberg (BE)

(73) Assignee: Hansen Transmissions International NV, Edegem (BE)

( * ) Notice: Subject to any disclaimer, the term of this patent is extended or adjusted under 35 U.S.C. 154(b) by 879 days.

(21) Appl. No.: 12/679,417

(22) PCT Filed: Nov. 20, 2008

(86) PCT No.: PCT/BE2008/000095
§ 371 (c)(1),
(2), (4) Date: Mar. 22, 2010

(87) PCT Pub. No.: WO2009/065192
PCT Pub. Date: May 28, 2009

(65) Prior Publication Data
US 2010/0197446 A1 Aug. 5, 2010

(30) Foreign Application Priority Data
Nov. 21, 2007 (BE) .................................. 2007/0560

(51) Int. Cl.
*F16H 57/08* (2006.01)
(52) U.S. Cl.
USPC ......................................................... 475/348
(58) Field of Classification Search
USPC ................................................. 475/331, 348
See application file for complete search history.

(56) References Cited

U.S. PATENT DOCUMENTS

| | | | |
|---|---|---|---|
| 3,258,995 A | | 7/1966 | Bennett et al. |
| 8,241,172 B2 * | | 8/2012 | Lahtinen et al. ............... 475/348 |
| 8,246,505 B2 * | | 8/2012 | Saenz De Ugarte et al. .. 475/348 |
| 2004/0038771 A1 * | | 2/2004 | Fox ................................ 475/348 |
| 2005/0075211 A1 * | | 4/2005 | Fox et al. ....................... 475/348 |
| 2006/0142114 A1 * | | 6/2006 | Fox ................................ 475/348 |
| 2007/0265134 A1 * | | 11/2007 | Robuck ......................... 475/331 |
| 2008/0194378 A1 * | | 8/2008 | Fox ................................ 475/347 |

FOREIGN PATENT DOCUMENTS

| | | |
|---|---|---|
| DE | 110 097 | 12/1974 |
| DE | 196 49 422 | 6/1998 |
| EP | 0 054 280 | 6/1982 |
| EP | 1 559 928 | 8/2005 |
| EP | 1 788 281 | 5/2007 |
| WO | 2004/013516 | 2/2004 |
| WO | 2007/016336 | 2/2007 |

OTHER PUBLICATIONS

International Search Report dated Mar. 3, 2009, from corresponding PCT application.

* cited by examiner

*Primary Examiner* — David D Le
*Assistant Examiner* — Huan Le
(74) *Attorney, Agent, or Firm* — Young & Thompson

(57) ABSTRACT

Planet carrier of an epicyclic gear system with planetary shafts which are connected fixedly to the planet carrier, onto which planet wheels are mounted rotatably using planetary bearings, the teeth of the planetary wheels being helical or chevron teeth, the planet carrier being of the cage type, and where at least two separate planetary wheels are mounted on each planetary shaft, each wheel of which being supported by at least one double-row tapered roller bearing, the outermost bearing ring of each double-row tapered roller bearing being integrated into the planetary wheel concerned.

2 Claims, 5 Drawing Sheets prior art ial shafts on which planetary wheels are mounted in a rotatable manner by means of planetary bearings.

PLANET CARRIER OF THE CAGE TYPE

The present invention concerns a cage-type planet carrier.

In particular, the present invention concerns a planet carrier for an epicyclic gear system equipped with planetary shafts which are connected fixedly to the planetary carrier and on which planetary wheels are mounted in a rotatable manner by means of planetary bearings.

More specifically, the invention concerns a cage-type planet carrier, the planet wheels of which are placed between two walls of the planet carrier, where these walls support the planetary shafts on either side of the planet wheels.

In addition, the invention concerns a planet carrier for planetary gear systems containing gears which have oblique or helical gear teeth.

For planetary gear transmissions upon which extremely high demands are made and which are subjected to extremely high loads, such as wind turbines for instance, gears with helical teeth are usually used, since such gears with helical teeth possess better characteristics both for achieving the required nominal capacity and reduction of sound and vibration.

Some kinds of such cage-type planet carriers for epicyclic gear systems with oblique teeth are already known.

However, they still have major problems and could still be optimised considerably.

When designing an epicyclic gear system, a selection has to be made regarding: the helix angle of the gear teeth and the dimensions to be used for the ring wheel (annulus), sun wheel and the planetary wheels, in order to be capable of taking the required load and to achieve the correct gear ratio.

To achieve a particular gear ratio, the ratios between the diameters of the various gears must meet certain requirements.

In order to be capable of withstanding larger loads, it may be possible to extend the dimensions of the entire gear transmission (which should be limited as far as possible, of course, for economic and logistic reasons) or to increase the helix angle of the gear teeth.

A problem is that not just any selection of the parameters stated above will be compatible with a proper bearing support.

Choosing a larger helix angle for the gear teeth will result for instance in more stringent requirements on the planetary bearing.

These more stringent requirements can only be met by selecting a planetary bearing with certain minimum dimensions, as a result of which minimum dimensions for the entire gear train may be imposed.

It is therefore obvious that only a proper combination of all possible factors may result in the creation of a gear train that can take larger loads with relatively small dimensions, at least in comparison with existing planetary gear systems.

There are a number of restrictions when selecting planetary bearings with larger radial dimensions, as the gear rim of the planetary wheels must have a certain thickness to avoid negative interactions between the teeth of the planetary wheels and the outer bearing ring of the planetary bearing, or simply to withstand the loads or to ensure a certain minimum lifespan for the bearing.

Along the axial direction, the gear capacity required imposes a minimum value on the gear width, and sufficient gear width is also necessary in order to be capable of taking the torques on the planetary wheels by means of a bearing, or to achieve proper axial and radial bearing support for the planetary wheels.

The helix angle of the gear teeth affects the planetary bearing, since gears with helical teeth are inclined to move away from each other axially.

The greater the helix angle of the teeth, the greater the axial forces between the teeth.

An epicyclic gear system has this tendency for the gears to move apart axially, both between the ring wheel and the planetary wheels, and between the planetary wheels and the sun wheel.

The axial force a moving planetary wheel is subjected to in relation to the ring wheel is opposite to the axial force exerted by the sun wheel on the said planetary wheel.

These axial forces therefore cancel each other out, as a result of which there is no net axial force seen at the planetary shafts and the planetary bearing, so that this does not affect the planetary bearing.

However, since these opposing axial forces, in the case helical teeth are used, are exerted at the ring wheel and sun wheel respectively each planetary wheel is subjected to tilting moments which have to be handled by the planetary bearing.

It is obvious that single-row bearings, i.e. bearings with only one row of roller elements, are not suitable for dealing with such tilting moments, as the edges of the roller elements would be subject to extremely large stresses in such a case.

For this reason (and to restrict the dimensions), planetary wheels are usually mounted on their planetary shaft by means of a bearing which is capable of dealing with tilting moments, usually a two-row or multiple-row bearing, such as a double-row tapered roller bearing or a double-row cylindrical bearing.

Another important factor to consider in this discussion about the tilt moment on the planetary wheels is the gear width.

This is initially determined on the basis of the required load.

It is obvious that the same gear width is capable of transmitting more power when a larger helix angle is used. However, a larger helix angle also means that a larger tilting moment of the planetary wheels must be dealt with, which in turn might demand sufficient gear width for the bearing.

In short, smaller gear widths may be possible for a given capacity if a larger helix angle is chosen, but the decrease in the gear width is limited by the requirement that the planetary bearing must still be capable of handling the tilt moment at the planetary wheels.

However, keeping the radial dimensions of the epicyclic gear system as small as possible is sometimes preferred, so that fewer demands are made upon the axial dimensions of the planetary system, for instance because manufacturing ring wheels of large dimensions is difficult and therefore very expensive, or because transporting such a gear system is a problem.

However, for certain required radial dimensions, the maximum achievable load exerted onto the planetary bearing is limited to a certain level once again.

However, extending the bearing in the axial direction by applying multiple rows of roller elements behind one another could solve this problem.

Multiple rows of roller elements are placed axially one after the other, for instance by placing two or more planetary bearings below a planetary wheel or by using planetary bearings with even more rows of roller elements, for instance roller bearings with four or more rows of roller elements.

A downside of these existing designs, which use multiple planetary bearings or multiple rows of planetary bearings to carry a planetary wheel on a planetary shaft, is that this results in uneven load distribution between the various planetary bearings as well as between the various rows of roller elements, if multiple rows of bearings are used.

The problem is not so much about achieving proper load distribution between the various planetary wheels.

As a result of their radially symmetrical positions and the rotation of the planet carrier and the planetary wheels between a fixed ring wheel and an often more or less floating sun wheel, the planetary wheels are automatically subjected to approximately the same load, as in a design with three planetary wheels, for example.

However, it is clear that it is difficult, if not impossible, to achieve even load distribution across multiple rows of roller elements that are placed at a certain axial distance from each other below a planetary wheel, whether this involves rows of roller elements from various single-row bearings, or rows of roller elements from one or more than one multiple-row bearing.

This is already the case for a purely radial load on the planetary wheels.

In addition, helical teeth generate the tilting moment mentioned previously, as a result of which the planetary wheels are inclined to tilt around an axis that is perpendicular to the axis of rotation of the planet carrier, which makes it even more difficult to achieve an even load distribution between the various planetary bearings or the rows of roller elements of these planetary bearings.

After all, under the influence of this torque, the stresses are mainly focused on the axially outermost bearings or rows of roller elements, whereas the intermediate bearings or rows of roller elements are less exposed to this tilting torque.

This problem of uneven load distribution becomes highly evident as soon as more than two rows of roller elements are used in the planetary bearings to support each planetary wheel, whether this involves more than two rows of roller elements from several single-row bearings, or more than two rows of roller elements from one or more multiple-row bearings.

After all, two rows of roller elements suffice to handle a tilting moment, so that in such a configuration with only two rows of roller elements the load on each row of roller elements is determined directly.

This case is known as a statically determined system.

However, if more than two rows of roller elements, axially placed with respect to one another, are used to support a planetary wheel, then it will not be immediately clear to what extent each row of roller elements is contributing to supporting the planetary wheel.

This case is known as a statically over-determined system.

In a lot of cases, certain rows of roller elements will therefore be subjected to the major part of the load, whereas other rows of roller elements will only be partially loaded or not at all.

Such planetary bearings with more than two rows of roller elements are therefore usually unevenly loaded and as a result are far from efficient.

Uneven load distribution of the bearings or the rows of roller elements within the bearings may lead to early wear of the bearings or of parts that are supported by these bearings.

To make things clear, we would like to point out the fact that there are already a number of planet carrier designs with planetary shafts, each of them equipped with more than one planetary bearing, where even load distribution across the various rows of roller elements of the planetary bearings is almost achieved.

However, these planet carriers are of a totally different type than the planet carriers which this invention is referring to.

More specifically, these existing planet carriers use what is called a bogie plate, which supports the planetary shafts in the centre (and in the centre only), and where bearings are placed on either side of the bogie plate in order to support a planetary wheel.

The planetary shafts are mounted loosely onto the bogie plate using a kind of ball joint, which naturally ensures proper load distribution.

Such planet carriers with bogie plates are intended for special purposes, for instance in wind turbines where the gearbox with the ring wheel has a fixed position in relation to the wind turbine housing and extensive integration of the rotor bearing is involved.

As a result of rotor load or play in the bearing or other such aspects, the rotor shaft in such configurations is subject to rather large movements with respect to the housing, resulting in substantial alignment errors between the gear wheels.

To cope with these alignment errors, the planetary shafts are mounted on the bogie plate in a moveable manner, allowing the gear wheels to position themselves.

The present invention is typically intended for gear systems in wind turbines, for example, where the gearbox is hung on the rotor shaft, as a matter of speaking, and where the planet carrier and the sun wheel are in addition to that possibly supported by means of bearings in the gear box housing.

The link between the gearbox and the wind turbine housing is somewhat elastic, allowing the ring wheel, the planetary wheels and the sun wheel to follow the movement of the rotor shaft continuously and to remain precisely aligned (apart from possible small deviations).

It is clear that load distribution in such a rather rigid configuration, which the invention refers to, and where planetary wheels are supported by more than one row of roller elements behind one another, may be problematic and therefore requires a solution.

Apart from the fact that the bogie plate solution is intended for other applications, the downside of such gear systems is that they are very difficult to manufacture, resulting in high cost prices.

In addition, certain gear wheel types are excluded if bogie plates are used.

For instance, the use of helical teeth is out of the question for a planet carrier with a bogie plate.

DE 0.054.280 has another solution, the objective of which is to achieve even load distribution across the various planetary wheels.

The attention is in this case mainly focused on the problem that extreme distortions may occur at the planetary shafts and the sun wheel if large gear ratios are used.

The solution offered is not to combat the distortions that arise, but on the contrary to allow them to occur.

As was explained above, such a solution is unsuitable for the applications that this invention refers to, since distortions must be restricted as much as possible, of course.

In addition the embodiment of DE 0.054.280 has many other disadvantages.

The planetary wheels are supported by needle bearings, separated from each other by retainer plates, which will inevitably result in wear.

In addition, such a solution is totally unsuitable for oblique gear teeth.

The objective of the current invention is to offer solutions to one or several disadvantages, including those mentioned previously.

For this purpose, the current invention is a planet carrier for an epicyclic gear system, with planetary shafts which are connected fixedly to the planet carrier, onto which planetary wheels are mounted rotatably using planetary bearings, where the teeth of the planetary wheels are helical or chevron teeth, with the planet carrier being of a cage type, and in which more specifically the planet wheels are placed between two walls of the planet carrier, and where these walls support the planetary shafts on either side of the planetary wheels, and where, according to the invention, at least two separate planetary wheels are mounted on each planetary shaft, each wheel of which being supported by at least one planetary bearing, each planetary wheel being supported by a planetary bearing which is a double tapered roller bearing, where the outer bearing ring of each double-row tapered roller bearing is integrated in the said planetary wheel The major advantage of such a planet carrier according to the invention is that it achieves a compact design which is capable of dealing with very high loads.

Indeed, double-row tapered roller bearings are extremely suitable for both radial and axial loads as well as for taking tilting moments, which, as was explained before, are inevitably present if helical teeth are used.

In addition, these double-row tapered roller bearings take up relatively little space along the axial direction in comparison with other types of bearings, and they are able to take relatively high tilting moments.

This means that a greater helix angle can be used for the same required gear width than with other types of bearings, so that comparatively higher capacities can be realized.

In addition, for the same required radial dimension of the gear system, with a planetary bearing assembly, in which the tapered roller bearings have outer bearing rings which are integrated in the planetary wheels, larger loads can be taken than would be the case with a planetary bearing assembly in which the outer bearing rings were not integrated in the planetary wheels.

The technical problems that have to be overcome when manufacturing a ring wheel for an epicyclic gear system for instance, as well as the problems that occur during its transport and therefore the total costs generated by such a gear wheel, will rise exponentially as the ring wheel dimensions increase, which is why it is extremely useful to be able to withstand to greater loads with relatively limited gear widths and gear wheel diameters, as is the case with an epicyclic gear system according to the invention.

Another major advantage of such a planet carrier according to the invention is that load distribution between the planetary bearings and/or the rows of roller elements of these bearings is much better and more even.

In particular, the load distribution is improved between the bearings or rows of roller elements of the bearings which are in various planes perpendicular to the axis of rotation and at a given axial distance from each other.

The reason for this is that the even load distribution depends less on a highly accurate adjustment of the play in each bearing or in each row of roller elements of the bearings.

After all, each individual planetary wheel on a planetary shaft of the planet carrier has some play and is therefore able to move slightly within its own supporting bearing or supporting bearings, allowing load distribution between the rows of roller elements of that bearing or between the roller elements of the various supporting bearings.

In general, if more than one planetary wheel is used on a single shaft, better load distribution across the various rows of roller elements of the bearings axially placed next to each other is achieved than if the same bearings, as in the existing planet carriers, were to support just one planetary wheel.

For the same reason, improved load distribution is achieved for taking the tilting moment mentioned previously around an axis perpendicular to the axis of rotation, which occurs when helical teeth are used for the planetary wheels, as each planetary bearing below one of the planetary wheels —which are placed next to each other axially—can position itself separately to bear this tilting moment load.

Another advantage of using more than one planetary wheel for each planetary shaft, with each planetary wheel supported by a double-row tapered roller bearing, is that the assembly of the planetary bearings is greatly simplified.

After all, it is possible to install the subsequent axial planetary wheels one after the other on the planetary shaft.

Hereby, the first inner ring with accompanying tapered rollers of a first planetary wheel are firstly installed, then the concerned planetary wheel itself, after which the second inner ring of the planetary wheel concerned together with its accompanying roller elements are installed.

Finally, the next planetary wheel or wheels can be installed in the same manner against the previous planetary wheel.

It can also be seen that integration of the outer bearing rings of the double-row tapered roller bearings would not even be possible without using separate planetary wheels, since a configuration with multiple double-row tapered roller bearings having only one outer bearing ring, which is integrated in a planetary wheel, cannot be mounted on a planetary shaft.

According to a preferred embodiment of a planet carrier in accordance with the invention, each planetary wheel is supported by a planetary bearing, being a double-row tapered roller bearing with an outer bearing ring integrated into the planetary wheel concerned, the rows of tapered rollers of each double-row tapered roller bearing being mounted in a so-called O-configuration.

In such an O-configuration of the rows of tapered rollers the diameter of the tapered rollers decreases in an axial direction towards the other row of tapered rollers.

Such an O-configuration of the rows of tapered rollers is the opposite to a so-called X-configuration of the rows of tapered rollers, in which X-configuration the diameter increases along the previously mentioned axial direction towards the other row of tapered rollers in the bearing.

An important difference between the two configurations is the position of the centres of pressure on the axis of rotation of the tapered roller bearings.

These centres of pressure are the top angles of the pressure cones of the rows of roller elements, such a pressure cone being defined by the set of directions through the centre of the tapered rollers, along which the load from the outer bearing ring towards the inner bearing ring of the tapered roller bearing can be transferred.

In an O-configuration of the rows of tapered rollers, the distance between these centres of pressure on the axis of rotation of the bearing is greater than the distance between the geometric centres of the rows of tapered rollers.

It is exactly the other way round for an X configuration.

This means that rows of tapered rollers in an O-configuration are capable of withstanding large tilting moments, even if the distance between the geometric centres of the rows is relatively small.

The radial load arising from the tilting moment load and its resulting deformations on the bearing are also smaller in O-configurations than in X-configurations.

It is therefore obvious that a choice, as suggested in line with the aforementioned preferred embodiment in accordance with the invention, is a very good one in this given case of a planet carrier, since it allows a tilting moment to be taken easily, while restricting the necessary space in the axial direction to a minimum.

In order to better explain the characteristics of the invention, the following preferred embodiment of a planet carrier in accordance with the invention is described by way of example only, without being limitative in any way, with reference to the accompanying drawings, in which.

Figure 2:
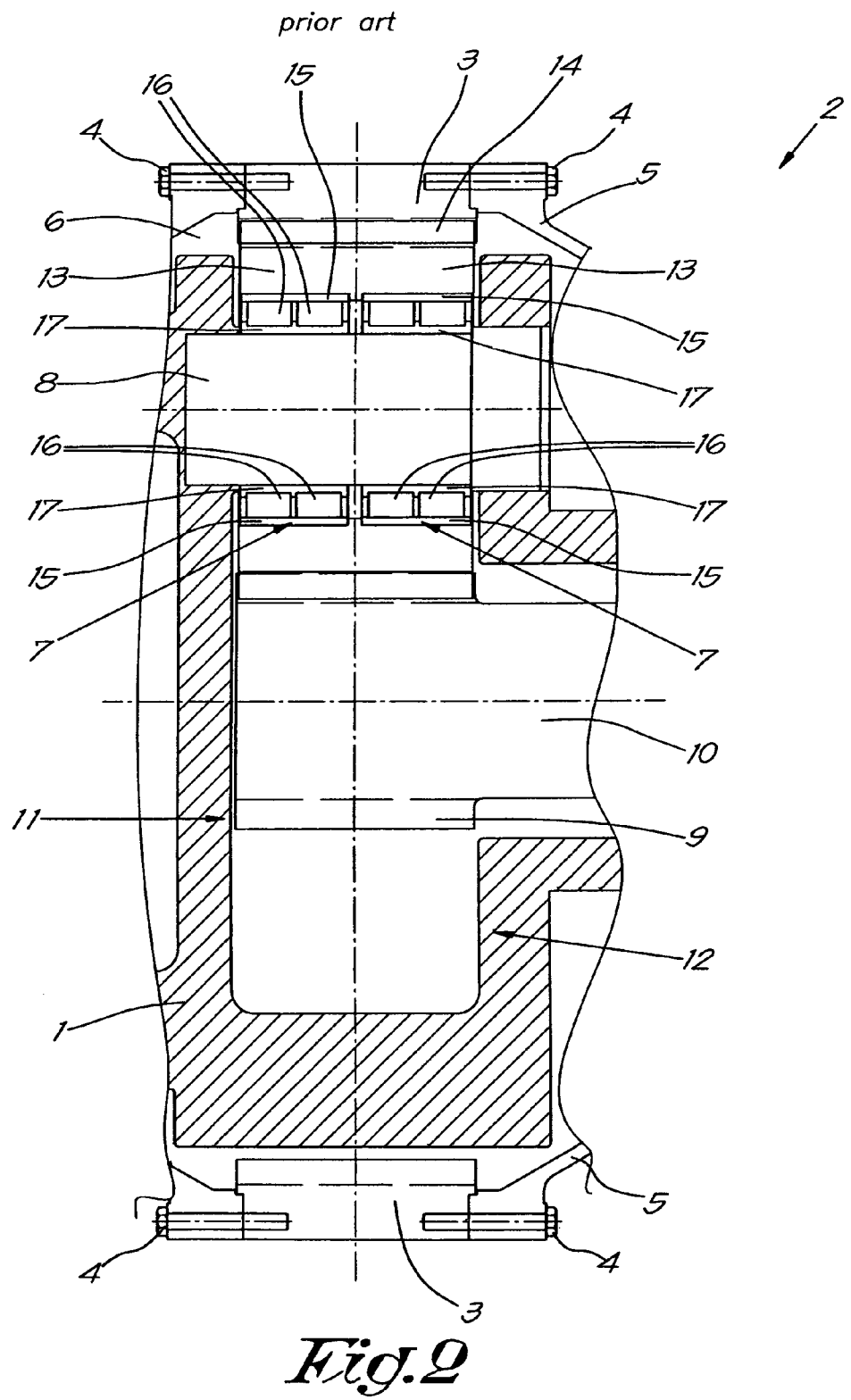
FIG. 2 represents also a cross-section of a known cage-type planet carrier, each planetary shaft now having one planetary wheel, which is supported by two double-row cylindrical roller bearings.
Figure 3:
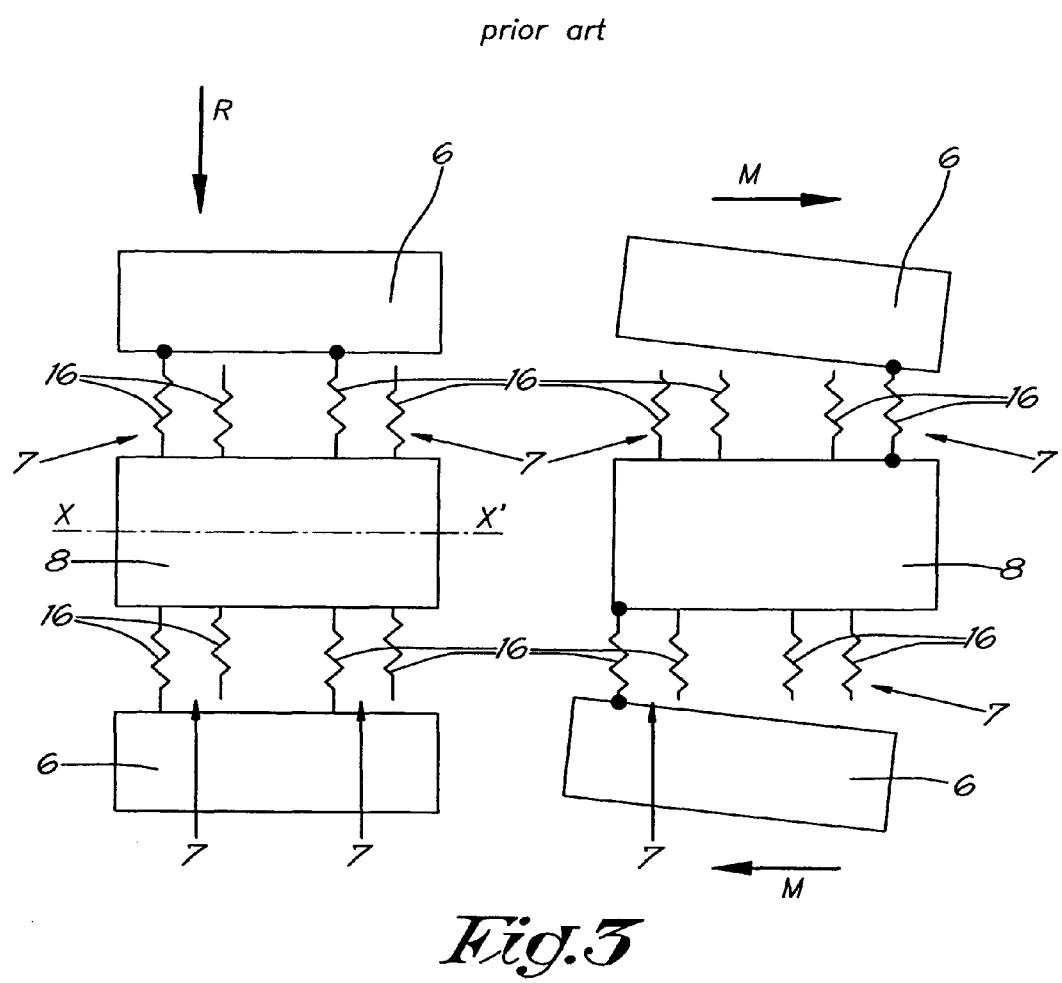
Figure 4:
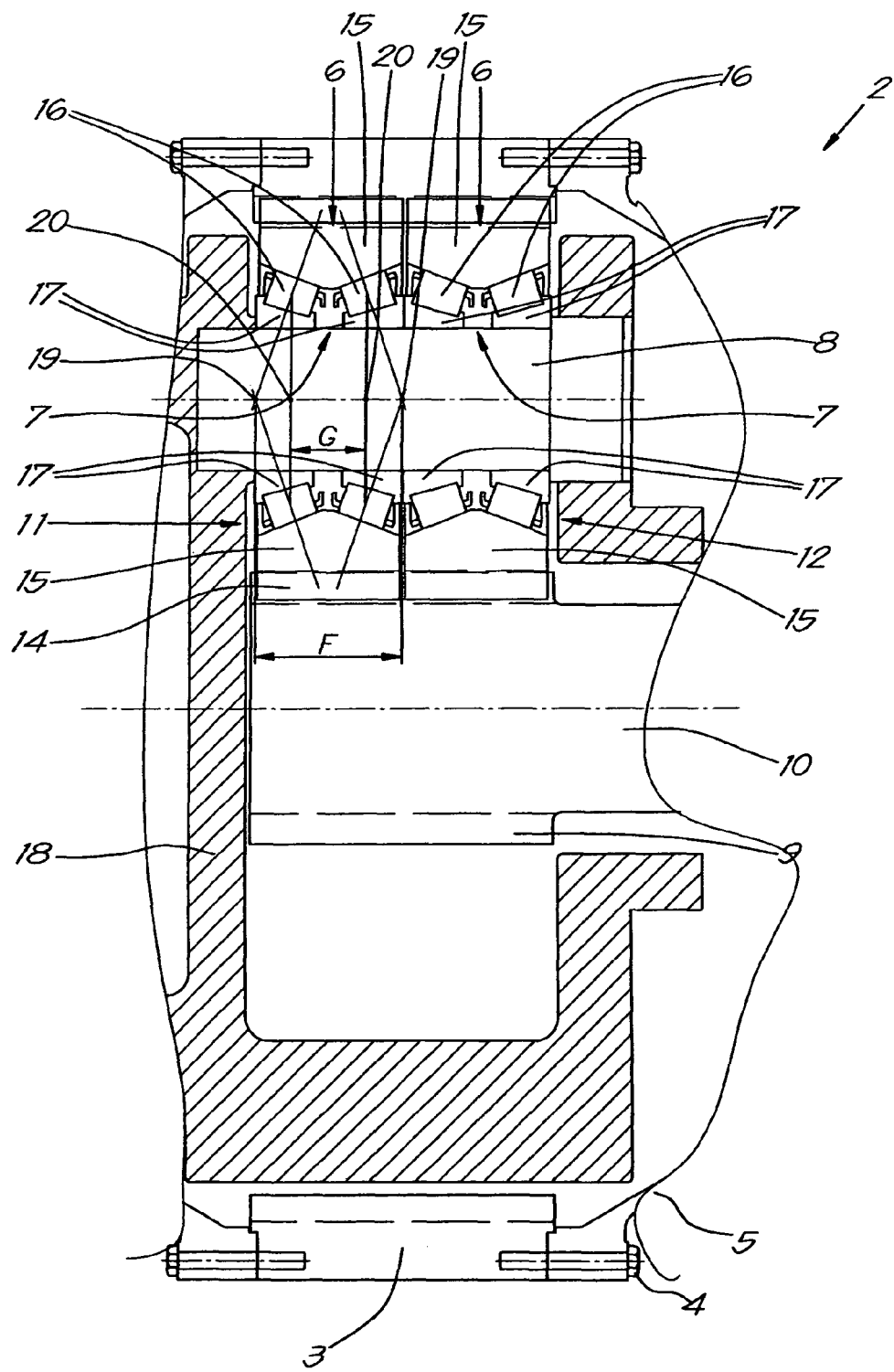
Figure 5:
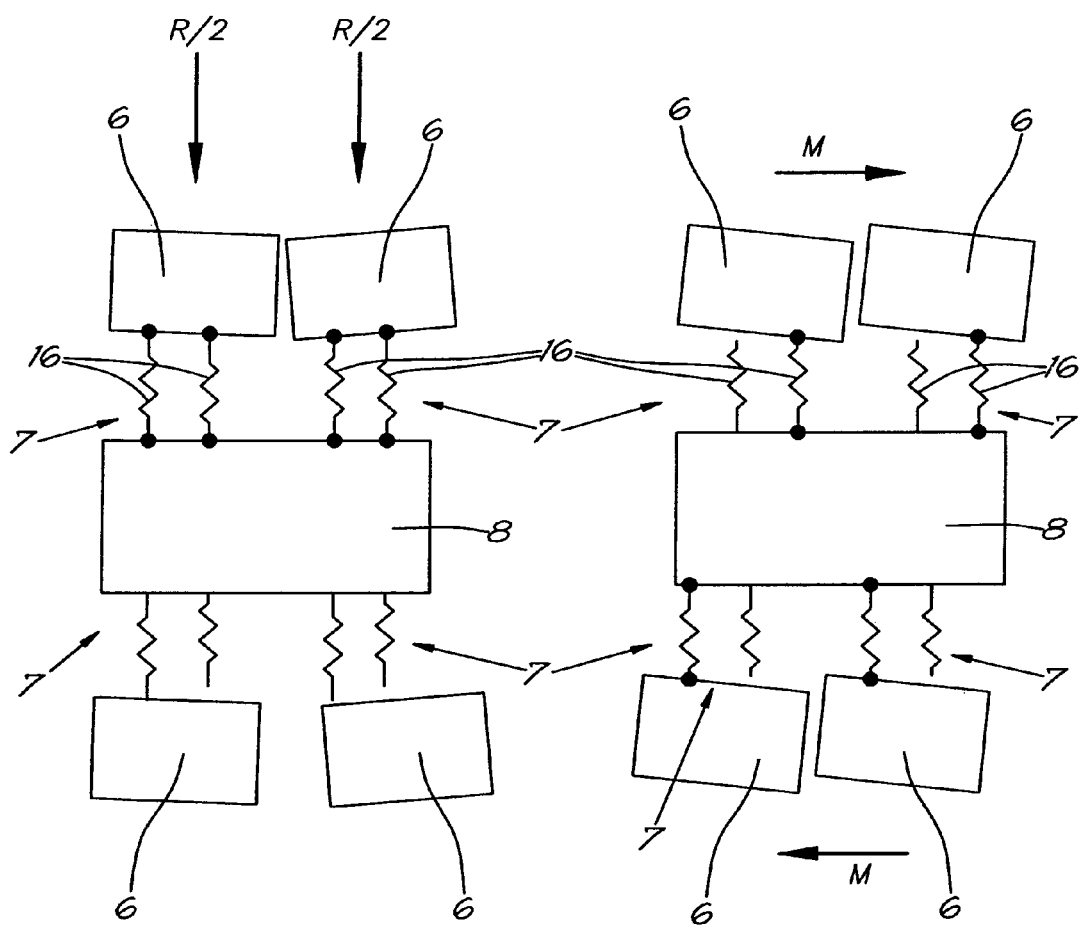

FIG. 3 provides a schematic diagram of how radial load and tilt moment load are distributed across the various rows of tapered rollers in the case of the planet carrier in FIG. 2;

FIG. 4 shows a cage-type planet carrier according to the invention, each planetary shaft being equipped with two planetary wheels, each one supported by its own double-row tapered roller bearing; and, FIG. 5 shows in a similar way as in FIG. 3 the distribution of radial load and tilting moment load between the various rows of tapered rollers for the planet carrier of FIG. 4.

Figure 1:
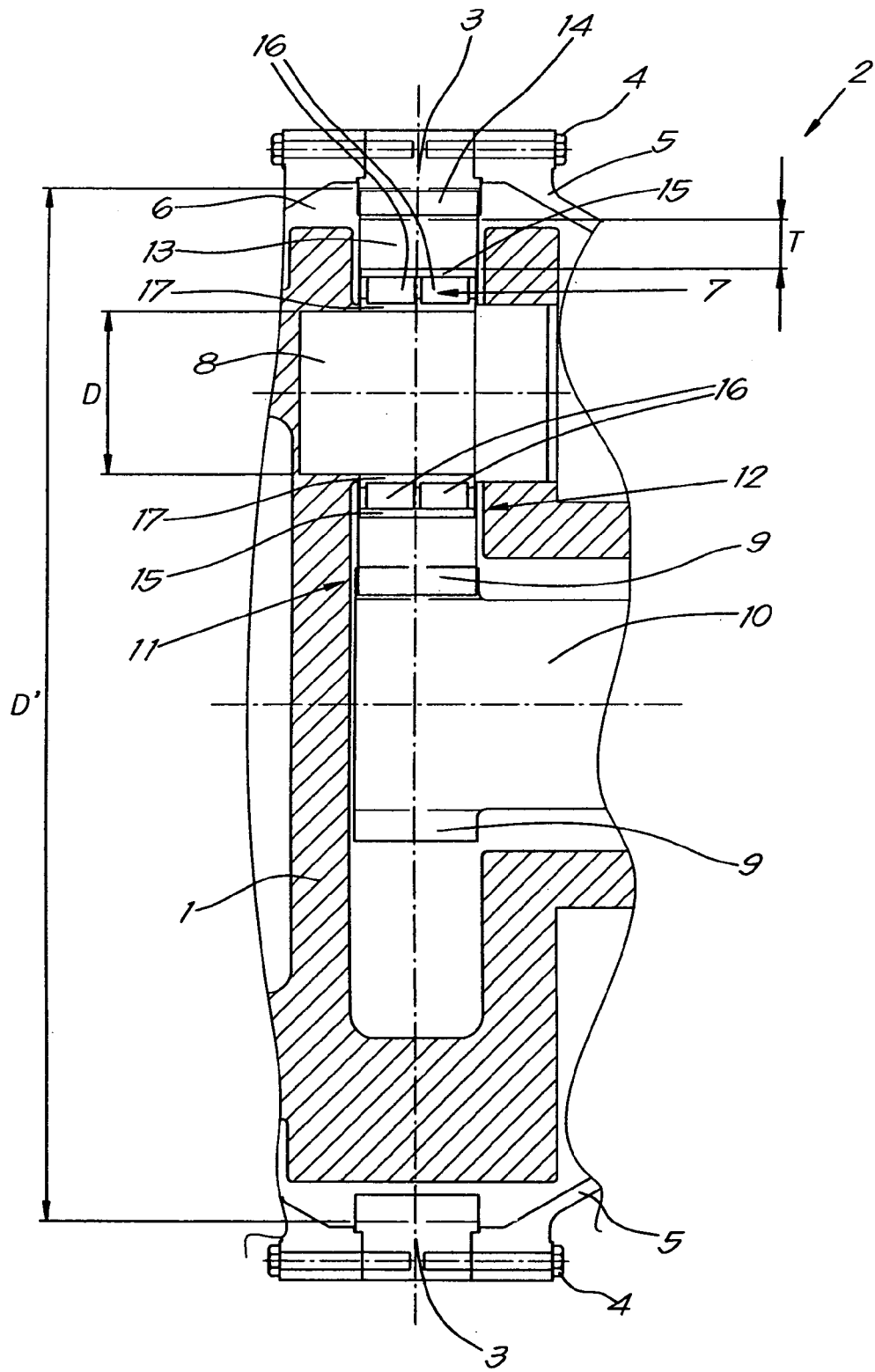
FIG. 1 represents a cross-section of a known cage-type planet carrier, each planetary shaft having one planetary wheel, which is supported by one double-row cylindrical roller bearing.

The planet carrier 1 shown in FIG. 1 is cage-type planet carrier and is part of an epicyclic gear system 2.

Furthermore, the epicyclic gear system is made up of: a ring wheel 3, which is connected to a housing 5 by bolts 4; planetary wheels 6, of which one only is shown in FIG. 1, which are mounted rotatably on the planetary shafts 8 of the planet carrier 1; and a sun wheel 9 mounted to an output shaft 10.

It is known that a planet carrier 1 of an epicyclic gear system 2 can be used to convert a slow rotation of the planet carrier 1 into a fast rotation of the output shaft 10, through interaction between the planetary wheels 6 on this planet carrier 1 with the ring wheel 3 and the sun wheel 9.

In this known caged-type planet carrier 1, the planet wheels 6 are placed between two walls 11 and 12 of the planet carrier 1.

In addition, the walls 11 and 12 support the planetary shafts 8 on either side of the planetary wheels 6.

As was explained in the introduction, the possibilities for mounting the planetary bearings 7 on the planetary shafts 6 are rather limited, since the dimensions and/or diameters D of the planetary bearings 7 must be limited.

One reason for this is that the thickness T of the gear rim 13 of the planetary wheels 6 must be sufficiently large to avoid problems of interaction between the teeth 14 of the planetary wheels 6 and the outer bearing ring 15 of the planetary bearings 7.

Knowing this and since the inner diameter D' of the ring wheel 3 is usually a given parameter, there will be little room left for planetary bearings 7 with large diameters D.

To ensure a certain degree of compactness of the bearing and to be able to cope with a sufficiently large load, double-row bearings are therefore often used for the planetary bearings 7, as shown in FIG. 1, where two rows of roller elements 16 are placed between a pair of outer bearing rings 15 and inner bearing rings 17, which may or may not be manufactured as a single piece.

In this case, double-row cylindrical roller bearings 7 were used, but tapered roller bearings are often used for this purpose too, and the bearings 7 may even be multiple-row bearings.

If larger loads are involved compared to the dimensions of the planet carrier 1, another existing solution should often be adopted for reasons previously mentioned, a solution shown as an example in FIG. 2, where the planet wheels 6 are mounted on the planetary shafts 8 using more than one planetary bearing 7, each of which being of the multiple-row cylindrical type.

However, this known planet carrier 1 has several disadvantages, especially regarding load distribution over the various rows of roller elements 16, which are placed at an axial distance from each other, as will be demonstrated below by making reference to FIG. 3.

The left part of FIG. 3 shows how in a planet carrier 1, manufactured as shown in FIG. 2, a radial load R on a planetary wheel 6, resulting for instance from gear teeth forces, is transferred through the rows of roller elements 16 from the pair of double-row cylindrical roller bearings 7 to the planetary shafts 8.

To indicate that the planetary bearings 7 with their rows of roller elements 16 are considered as deformable elements, as a result of radial play in the bearings 7, for instance, the planetary bearings 7 were shown as spring elements in FIG. 3.

Under the influence of radial load R and the radial play in the bearings 7, a planetary wheel 6 has a tendency to position itself.

If the radial play in the bearings 7 is not absolutely equal for all bearings, which is of course often the case in practice, this will cause certain rows of roller elements 16 to be more heavily loaded than other rows 16 when a planetary wheel 6 is positioning itself.

This has been indicated in the example shown in FIG. 3 by placing dots at the most heavily loaded rows 16.

The right part of FIG. 3 schematically shows a similar phenomenon, which occurs under the influence of a tilting moment M, resulting for example from the interaction between the teeth of planetary wheels 6 with the sun wheel 10 and ring wheel 3 when helical teeth are used.

As indicated in FIG. 3, the axial outer rows of roller elements 16 are in this case subjected to larger loads than the rows of roller elements 16 which are situated more at the inner side.

Of course, this uneven load distribution across the bearings 7 and the rows of roller elements 16 affects negatively the lifespan of the bearings 7.

The solution to the above mentioned disadvantages is a cage-type planet carrier 18 according to the invention, a possible embodiment being shown in FIG. 4.

Typical of this planet carrier 18 according to the invention is that each planetary shaft 8 has two separate planetary wheels 6, each of which being supported by a planetary bearing 7 of its own, this planetary bearing 7 being a double-row taper roller bearing, where the outer bearing ring 15 of each double-row tapered roller bearing 7 is integrated in the planetary wheel 6 concerned.

It is important to notice that the invention refers to epicyclic gear systems 20 where the teeth 14 of the planetary wheels 6 are helical or chevron type (i.e. V shaped).

As has already been explained, using these helical teeth 14 generates axial forces which result in tilting moments on the planetary wheels and these tilting moments must be dealt with by the supporting bearings.

Double-row tapered roller bearings 7 are extremely suitable for the purpose.

An advantage of using double-row tapered roller bearings 7 is that they are very suitable for taking tilting moments and both large axial and radial loads, in addition to which the bearings 7 do need relatively little space in axial direction compared to the other bearings which are subjected to a similar load.

This means that tapered roller bearings can cope with larger tilting moments for the same gear width than cylindrical bearings can, for example, as a result of which —as has already been explained—helical teeth with a larger helix angle can be used without exceeding the maximum load capacity of the planetary bearings.

However, a disadvantage of double-row planetary tapered roller bearings 7 is that they take up a relatively large amount of space in the radial direction.

According to the invention the solution to this problem is to integrate the outer bearing rings 15 of the double-row tapered roller bearings 7 in the planetary wheels 6.

Additionally, multiple planetary wheels 6 are provided on each planetary shaft 8, which planetary wheels 6 are each equipped with their own double-row tapered roller bearing 7, so that a larger load capacity is obtained.

By using separate planetary wheels 6 integrated Outer bearing rings 15 can be applied, while at the same time a proper load distribution across the separate double-row tapered roller bearings 7 is obtained.

In other words, a planet carrier 18 according to the invention has been adapted to all possible factors in an optimal way.

Both the radial and axial dimensions are restricted to the minimum with a maximum capacity for the dealing with both radial loads and moment loads.

A substantial part of the idea of the invention is not to work with a single planetary wheel 6 on each planetary shaft 8, possibly supported by more than one planetary bearing 7, as is the case with known planet carriers 1, but to "split up" this planetary wheel 6, so to speak, so that each part, forming a planetary wheel 6 in itself, is supported by its own planetary bearing 7.

The advantage of this "split" is explained hereafter making reference to FIG. 5, where the load distribution across the various rows of roller elements 16 of the planetary bearings 7 is shown similarly to FIG. 3, in the left part for radial load R and in the right part for tilt moment load M respectively.

"Splitting" the planetary wheels actually results in separate systems, in the shape of separate planetary wheels, which are all statically determined, so that the above mentioned problem—which occurs in statically over-determined systems—is resolved.

It is clear that both planetary wheels 6 of planet carrier 18 according to the invention will tend to position themselves separately under the influence of radial load R or tilting moment M.

In the event of radial load R, for instance, part of the radial load R is dealt with by one of the planetary bearings 7 and the rest of radial load R by the other planetary bearing 7.

Since each planetary wheel is able to position itself independently, the part of the radial load R concerned, no matter the difference in play in the rows of roller elements 16 in the supporting bearing 7 (at least within certain boundaries and for bearings with a maximum of two rows of roller elements 16) will be almost evenly distributed between both rows of roller elements 16 of the bearing 7.

So, in the aggregate, a planet carrier 18 according to the invention will therefore achieve better distribution of radial load R across the four rows of roller elements 16 of the two planetary bearings 7 than known planet carriers 1, where a single planetary wheel 6 is supported by a total of four rows of roller elements 16 with different amounts of radial play, as is shown in FIG. 3.

It is clear that there is similarly better load distribution of tilting moment M between the four rows of roller elements 16 (resulting from independent positioning of planet wheels 6), since each planetary wheel 6 will position itself and the rows of roller elements 16 and the partial load on each planetary wheel 6 will be distributed across the two rows of roller elements 16 of that planetary wheel 6.

As a result, the four rows of roller elements 16 of each planetary shaft 8 play a role in transferring tilting moment load M, whereas in the existing example of FIG. 3, only the load on the axially outermost rows of roller elements 16 is worth mentioning.

The embodiment of a planet carrier 18 according to the invention, as shown in FIG. 4, has a few more extremely interesting features.

More specifically, the planetary wheels 6 in this variant are supported by planetary bearings 7, which are double-row tapered roller bearings, and the rows of tapered rollers 16 are placed in a so-called O-configuration.

As was explained above, the diameter of the tapered rollers 16 decreases axially towards the other row of tapered rollers 16 of bearing 7 in such an O-configuration of the rows of tapered rollers 16.

An interesting feature of such an O-configuration is, that the distance F between the centres of pressure 19 of the rows of tapered rollers 16 on the axis of rotation AA' of each bearing 7 is greater than the distance G between the geometric centres 20 of the rows of tapered rollers 16 of that bearing 7.

This means that an O-configuration of tapered roller bearings 7 with rows of tapered rollers 16 is capable of dealing with large tilting moments M, even if the distance G between the geometric centres of the rows of tapered rollers 16 is rather limited.

Since a planet carrier 18 according to the invention must be capable of dealing with these tilting moments, this configuration is extremely interesting.

Another remarkable feature of the embodiment of planet carrier 18 according to the invention, as shown in FIG. 4, is that the outer bearing ring 15 of the double-row tapered roller bearings has been manufactured as a single piece.

In addition, the bearing ring 15 is integrated in the planetary wheel 6.

This results in a planet carrier 18 which is both efficient and very compact.

Besides, using separate planetary wheels 6 for each supporting double-row tapered roller bearing 7 makes it much easier to integrate the outer bearing ring into the planetary wheel 6 concerned.

After all, creating a double wedge in the bore in the planetary wheel 6 for the purpose suffices, which may be done by grinding or milling, for instance.

If the same pair of double-row tapered roller bearings 7 such as the ones in FIG. 4 were to be used to support only a single planetary wheel 6, which is usual in existing planet carriers 1, then such an integration of the outer bearing rings 15 in the one and only planetary wheel 6 would be impossible to achieve, since in that case conical rollers would have to be placed between two connected double wedges in the bore of planetary wheel 6 during the assembly, which is impossible, of course.

It is clear that a lot of alternatives are possible for a planet carrier 18 according to the invention.

The inner bearing rings 17 of the planetary bearings 7 of each planetary shaft 8 should preferably be directly in contact with one another.

This would make assembly extremely simple. Indeed, it only requires the inner bearing rings 17 to be pushed along the planetary shafts 8 until they are in contact with one another during assembly.

The bearings 7 should preferably be designed in such a way that pushing the inner bearing rings 17 up against each other will automatically result in the required play or pre-load in the bearings 7.

More particularly, the bearing suppliers will be able to make sure that when the inner bearing rings 17 of each bearing 7 touch each other directly or through an intermediate spacer ring, proper bearing play or pre-load can be achieved.

Alternatively, the inner bearing rings 17 of the planetary bearings 7 of each planetary shaft 8 can be in contact with one another using one or more spacer bushes which are mounted on the planetary shaft 8 between the inner bearing rings 17.

In this way it is once again very easy to achieve the appropriate positioning of the bearing rings 17 on the planetary shafts 8.

The axial location is obtained by enclosing the inner bearing rings 17 of the planetary bearings 7 of each planetary shaft 8 between a collar on the planetary shaft 8 on the one end and a wall 11 or 12 of the planet carrier 18 on the other end.

The inner bearing rings 17 are preferably supported by the wall 11 or 12 mentioned above of the planet carrier 18, against a surface that has been mechanically processed for the purpose.

An advantage not yet mentioned regarding the use of integrated outer bearing rings 15 is that they cannot get loose and so cause wear, so that the lifespan of the bearings 7 is higher than in the case of individual non-integrated outer bearing rings 15.

Furthermore, it is possible, according to the present invention, to make local changes to the microgeometry of the teeth 14 of the planetary wheels 6 in order to achieve improved load transfer from the sun wheel 9 and the ring wheel 3 towards the planetary wheels 6.

For instance, one could opt for modifying the microgeometry of the planetary wheels 6 in such a way that it would be almost the same for planetary wheels 6 which are situated at the same axial distance from the walls 11 and 12 of the planet carrier, but that it would be different for planetary wheels 6 placed axially next to each other.

In the example shown in FIG. 4, each planetary shaft 8 is provided with two planetary wheels 6, but according to the invention it is also possible to install more than two planetary wheels on each planetary shaft 8, for example, with each planetary wheel 6 being supported by at least one planetary bearing 7.

The invention is in no way restricted to the embodiment of a planet carrier 18 according to the invention, described as an example and shown in the figures and such a planet carrier 18 can be realised in all kinds of other ways without being outside the scope of the invention.

The invention claimed is:

1. A planet carrier assembly of an epicyclic gear system, comprising:
   a cage-type planet carrier (18) with two walls (11, 12);
   planetary shafts (8) connected fixedly to the planet carrier (18);
   planetary bearings (7);
   at least two planetary wheels (6) mounted rotatably to each planetary shaft (8) using the planetary bearings (7),
   teeth (14) of the planetary wheels (6) being one of i) helical teeth and ii) chevron teeth;
   the planetary wheels (6) placed between two walls (11, 12) of the planet carrier (18),
   each of the two walls (11, 12) of the planet carrier (18) supporting a corresponding one planetary shaft (8) on either side of the planetary wheels (6), wherein,
   each of the planetary wheels (6) is supported by at least one of the planetary bearings (7), and
   each planetary bearing (7) is a double-row tapered roller bearing having an outermost bearing ring (15), the outermost bearing ring (15) of each double-row tapered roller bearing being integrated in the planetary wheel (6) concerned,
   wherein the planetary bearings further comprise inner bearing rings (17), and
   wherein the inner bearings rings (17) of the planetary bearings (7) of each planetary shaft (8) are in direct contact with each other.

2. A planet carrier assembly of an epicyclic gear system, comprising:
   a cage-type planet carrier (18) with two walls (11, 12);
   planetary shafts (8) connected fixedly to the planet carrier (18);
   planetary bearings (7);
   at least two planetary wheels (6) mounted rotatably to each planetary shaft (8) using the planetary bearings (7),
   teeth (14) of the planetary wheels (6) being one of i) helical teeth and ii) chevron teeth;
   the planetary wheels (6) placed between two walls (11, 12) of the planet carrier (18),
   each of the two walls (11, 12) of the planet carrier (18) supporting a corresponding one planetary shaft (8) on either side of the planetary wheels (6), wherein,
   each of the planetary wheels (6) is supported by at least one of the planetary bearings (7), and
   each planetary bearing (7) is a double-row tapered roller bearing having an outermost bearing ring (15), the outermost bearing ring (15) of each double-row tapered roller bearing being integrated in the planetary wheel (6) concerned,
   wherein rows of tapered rollers (16) of each double-row tapered roller bearing are in an O-configuration,
   wherein the planetary bearings further comprise inner bearing rings (17), and
   wherein the inner bearings rings (17) of the planetary bearings (7) of each planetary shaft (8) are in direct contact with each other.

* * * * *